May 1, 1956 B. B. BAUER ET AL 2,744,165

HEAD CONSTRUCTION FOR MAGNETIC RECORDERS AND REPRODUCERS

Original Filed June 12, 1948 2 Sheets-Sheet 1

INVENTORS:
Benjamin B. Bauer
and Lee Gunter, Jr.
BY Jones, Teach + Darbo
Att'ys

INVENTORS:
Benjamin B. Bauer and
Lee Gunter, Jr.
By: Jones, Tesch + Darbo
Attys.

2,744,165

HEAD CONSTRUCTION FOR MAGNETIC RECORDERS AND REPRODUCERS

Benjamin B. Bauer, Oak Park, and Lee Gunter, Jr., Chicago, Ill., assignors to Shure Brothers, Incorporated, Chicago, Ill., a corporation of Illinois Continuation of application Serial No. 32,558, June 12, 1948. This application May 29, 1950, Serial No. 164,866

4 Claims. (Cl. 179—100.2)

This invention relates to apparatus for magnetic recording and reproduction and particularly to improvements in transducer heads for magnetic recording and reproducing apparatus which employ an elongated paramagnetic wire or other continuous element as the recording medium.

Apparatus of this character has been known heretofore in which the wire passes in contact with two spaced apart pole pieces of a magnet in such manner that the is magnetized in a longitudinal direction. It is to the improvement of apparatus of this general character that the present invention is directed.

It is an object of the invention to provide an improved wire recorder head of the character described in which a highly efficient distribution of the flux is obtained, whereby a maximum proportion thereof is utilized in the magnetization of the wire.

It is another object of the invention to provide a wire recorder head of the character described having a slot within which the wire travels, rather than an opening which completely encloses the wire, whereby threading of the wire through the mechanism is not necessary.

It is another object of the invention to provide a wire recorder head of the character described having thin slotted pole pieces and a relatively long, grooved, non-magnetic supporting member for the pole pieces so constructed that the supporting member provides the major portion of the tracking for the wire and the wear upon the pole pieces is reduced to a minimum.

Another object of the invention is to provide a wire recorder head of the character described in which the pole pieces and their associated parts are fixed in their mutual relationship, whereby in manufacture the slot can be cut into all of the parts simultaneously and in use the optimum performance characteristics are maintained throguhout the life of the instrument.

It is another object of the invention to provide a method for forming simultaneously and accurately the slot in all of the parts including the pole pieces, the spacers between the pole pieces and the non-magnetic body.

Other objects and advantages will become apparent as the following description progresses which is to be taken in conjunction with the accompanying drawings, in which.

Figures 1, 2:
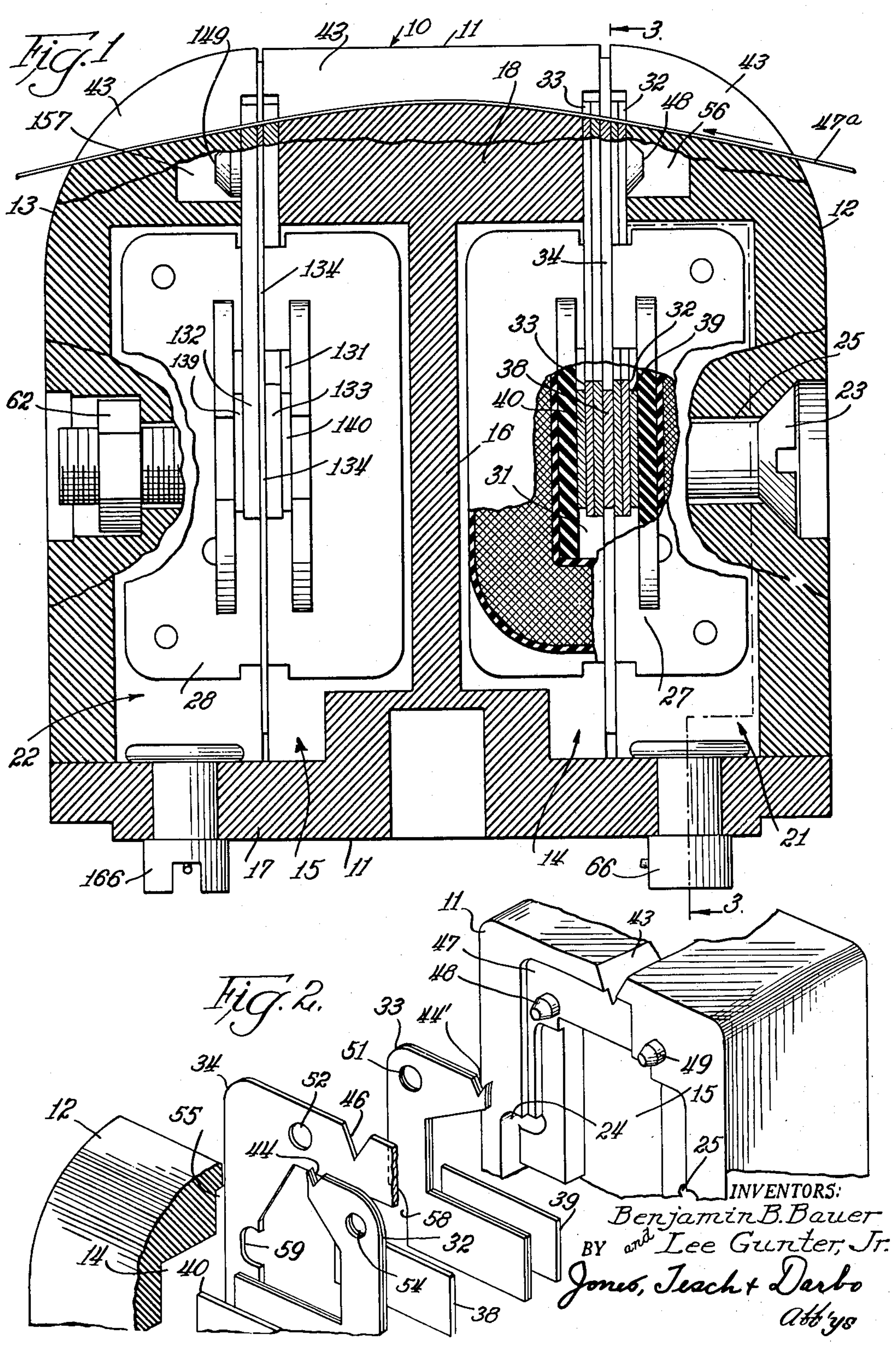
Fig. 1 is a longitudinal sectional view of the improved wire recorder head of the present invention taken along broken line 1—1 of Fig. 3 and with portions broken away to show internal structure.
Fig. 2 is an exploded perspective view of a portion of said head.

The wire recorder head of the present invention consists of a body member 10 which is composed of a suitable non-magnetic material, such as phenol formaldehyde resin or other resin, etc. The body 10 is made up of three sections, the generally T-shaped middle section 11 and the two end sections 12 and 13. The middle section 11 is provided with cavities 14 and 15 in its two end portions, which cavities are adapted to receive parts as will be described hereinafter. The cavities are separated by a central transverse wall 16 which joins the floor or base portion 17 with the top portion 18. The end sections 12 and 13 are provided with cavities 21 and 22 respectively, which cavities are complementary to the cavities 14 and 15 respectively. The base portion 17 extends lengthwise beyond the faces of the middle section 11 and forms the base for the two end sections 12 and 13. When said end sections are in place as shown in Fig. 1, they cooperate with the middle section 11 to completely enclose the cavities 14—21 and 15—22.

The sections are held together by the bolts 23 and 24 which pass through openings 25 and 26 in the sections. Within each of the cavities 14—21 and 15—22 is located a winding which is wound upon any suitable support structure, which may be similar to that described in Patent 2,428,826 to Benjamin B. Bauer, and will not be described in detail. The windings with their supports are referred to respectively by the numerals 27 and 28.

Figures 3, 4, 5:
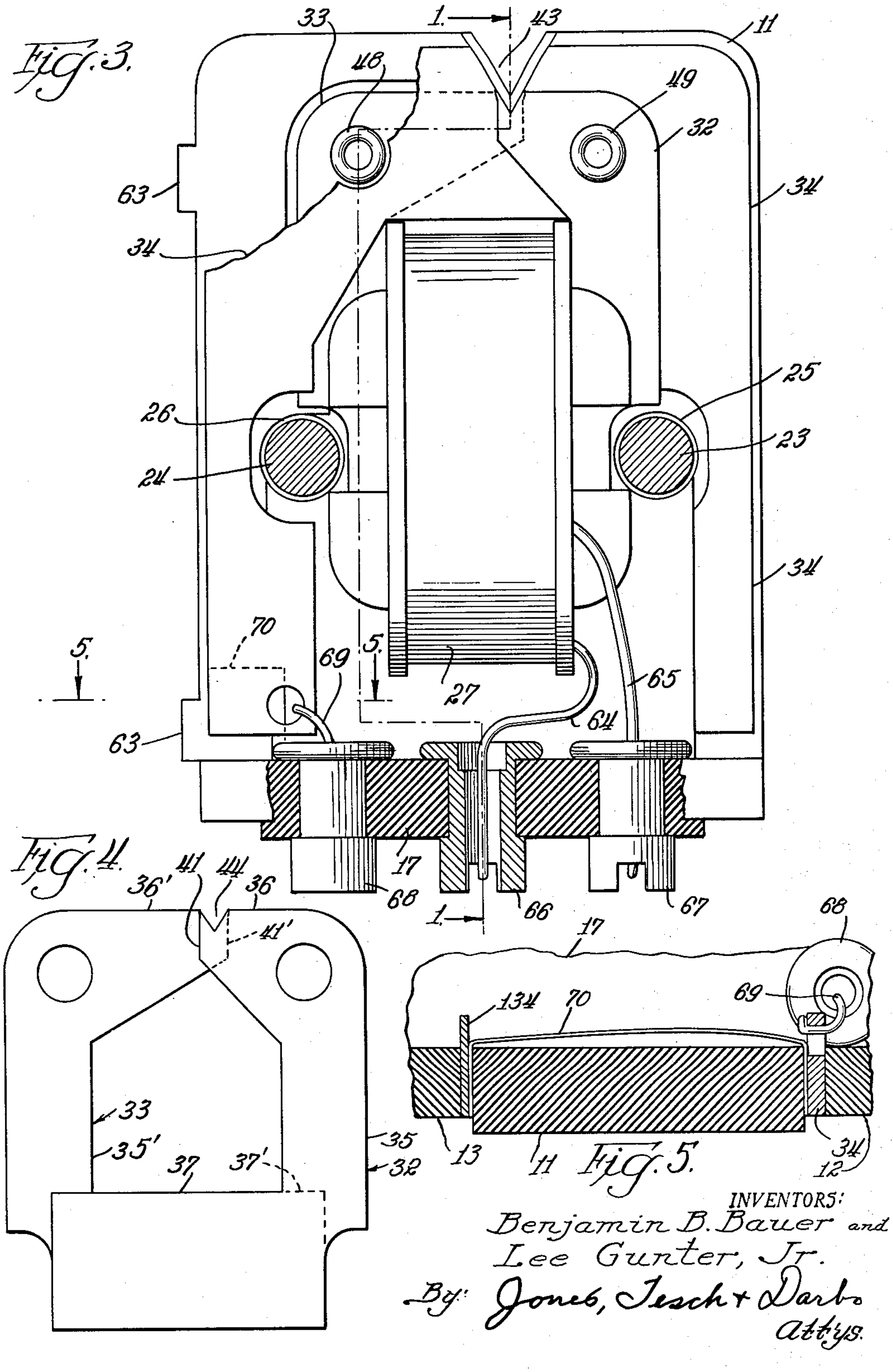
Fig. 3 is a transverse view taken along broken line 3—3 of Fig. 1, with the end section 12 of the head removed.
Fig. 4 is a transverse view showing the core members of one of the magnets and their mutual relationship.
Fig. 5 is a sectional view, taken along line 5—5 of Fig. 3, of a portion of the head.

The winding 27 has a central opening 31 in which are located the bottom portions of a pair of paramagnetic core members 32 and 33, each of which consists of a pair of laminations as shown. The bottom portions of members 32 and 33 are magnetically connected to each other by a paramagnetic member 38 and the upper portions are separated by a non-magnetic spacing member 34 as will be described hereinafter. Each core member is thin and flat in cross section and generally U-shaped, as is illustrated in Figs. 2 and 4. Memmber 32 consists of a vertically extending middle section 35 and top and bottom legs 36 and 37 which extend horizontally toward member 33. Core member 33 consists of corresponding parts 35′, 36′ and 37′ and is oriented oppositely to member 32. The bottom legs 37 and 37′ are in overlapping relationship within the opening 31 of the winding 27 and are magnetically connected together by the paramagnetic shim 38 and are firmly held in place in opening 31 by the shims 39 and 40. The top legs 36 and 36′ form the pole pieces of the core, and their end portions are in overlapping relationship. The said overlapping portions are designated by the numerals 41 and 41′ and are separated by the non-magnetic spacing member 34, which is in the form of an inverted U. The base section of the U separates the pole pieces and the legs extend downwardly on opposite sides of the cavity 14—21 respectively and between the faces of the body sections 11 and 12 bordering said cavity. The core members 32 and 33 form a magnetic circuit which is closed except for the non-magnetic gap between the overlapping portions 41 and 41′. The top surfaces of the pole pieces 36 and 36′ are depressed with respect to the top surfaces of the body sections 11 and 12 and the spacing member 34.

A second magnet is contained in the cavity 15—22, which is similar in construction to the magnet which has been described, with the exception that the core members each consist of a single piece instead of a pair of laminations. For simplicity of description, the parts of the second magnet are designated by numerals which are 100 greater in value than the numerals for the corresponding parts of the first magnet, and the second magnet will not be described in detail.

A generally V-shaped groove 43 is formed in the top surface of the head assembly and extends longitudinally from end to end of the same. In the head which is being specifically described the groove is not placed midway of the top of the head, but is displaced a short distance laterally from the middle of the head. This is merely for convenience, and the groove may be located in any position as desired. As is shown in Fig. 1, the base of the groove is not flat but is curved continuously from end to end in such manner that the mid portion thereof is higher than the ends. The pole piece 36 is shorter than the pole piece 36′, whereby the overlapping portions 41 and 41′ coincide with the base of the groove 43, and notches 44 and 44′ are provided in said pole pieces and a notch 46 is provided in the separating member 34, all of said notches coinciding with the groove 43. The paramagnetic wire 47*a* travels in the groove 43 in a direction from right to left as indicated by the arrow in Fig. 1, and the first magnet may be employed for erasing a previous record from the wire and the second magnet for making a new record on the wire. When it is desired to use the head for reproducing a record carried by the wire, the first magnet is not energized and the second serves as a pick-up. The stated arrangement is by way of example only and not of limitation, and the relative arrangement of the magnets and direction of travel of the wire may be as desired.

In Fig. 2 is illustrated more in detail the manner of fitting together the parts of the first magnet. The parts of the second magnet may be fitted together in a similar manner. The face of the middle head section 11 which surrounds cavity 14 and is opposed to the end section 12 has a recess 47 therein of a depth and shape adapted to accommodate the upper portion of the laminated core member 33, and has a lug 48 projecting from the surface of the recess 47 and another lug 49 projecting from the unrecessed portion of its face. The core member 33 has an opening 51 therein and is placed in the recess 47 with the opening 51 fitting over the lug 48. The non-magnetic separating member 34 has two openings 52 therein, only one of which is shown in Fig. 2, and is arranged to overlie the core member 33 and the unrecessed face of middle section 11 with the openings 52 fitting over the lugs 48 and 49. The next element is the laminated core member 32 which has opening 54 therein. The core member is arranged to overlie the spacing member 34 with the opening 54 fitting over the lug 49. The next element is the end body section 12 which overlies the separating member 34 and the upper portion of the core member 32. Said end section has a recess 55 in the face thereof generally similar to recess 47 in middle section 11 but shaped to accommodate the upper portion of core member 32. A pair of recesses which are not shown in Fig. 2 but one of which is shown at 56 in Fig. 1 are also provided in the face of end section 12 to accommodate the end portions of the lugs 48 and 49. The shims 38, 39 and 40 are inserted in tight pressure engagement with the surfaces of the core members 32 and 33 in the manner described heretofore. The thickness of spacing member 34 is the same as that of shim 38 and the legs of the spacing member are spaced far enough apart to accommodate said shim. The various parts have recesses to accommodate the bolts 23 and 24, such as the recess 58 in core member 33 and the recess 59 in spacing member 34.

The top surfaces of the pole pieces 32 and 33 are enclosed by the top walls of the recesses 47 and 55, and only the surfaces of the notches 44 and 44′ are exposed. This provides the advantage that the pole pieces are shielded and protected against outside objects and influences. The depressed relation of the top surfaces of said pole pieces with respect to the top surfaces of the body sections 11 and 12 results in the notches 44 and 44′ being shallower than the remainder of the groove 43. This provides the advantages that the flux is highly concentrated in the vicinity of the wire 47 and at the same time the deeper and longer walls provided by the body sections 11, 12 and 13 provide positive tracking for the wire and reduce the wear upon the pole pieces to a minimum.

The assembly of the second magnet is similar to that of the first and will not be described in detail. When the nut 62 is drawn up tightly upon bolt 23 and a similar nut is tightened on bolt 24, the parts are drawn together into a rigid assembly and are held rigidly in their relative positions by the lugs 48, 49, 148 and 149 and the openings which cooperate with the lugs as has been described heretofore. In practice, the parts are so assembled before the groove 43 is formed, and the groove is then cut by a suitable cutting instrument simultaneously into the top of the head and all of the parts thereof, including the non-magnetic sections 11, 12 and 13, the core members 32, 33, 132 and 133 and the spacing members 34 and 134. Lugs 63 are provided on the side of the middle section 11 and by means of these the head is locked in a suitable fixture (not shown) and the cutting instrument is moved relatively to the head and cuts the groove simultaneously into the parts of the head.

The ends 64 and 65 of the winding 27 are connected to the conductive terminal members 66 and 67, which are mounted in the base portion 17 of the middle section 11, and the ends of the winding 28 are connected to similar terminals. Said terminals may be connected to suitable sources of electrical energy, which are not shown. If desired, the metallic non-magnetic spacing members 34 and 134 may be connected to ground as illustrated in Fig. 5. Member 34 is connected to conductive terminal 68, which is mounted in base 17, by means of the conductor 69, and member 134 is connected to the same terminal by means of the conductive strip 70, which is connected as by soldering, to both of the spacing members 34 and 134. The terminal 68 may be connected to ground.

Application S. N. 32,558, filed June 12, 1948, originally filed by us jointly and later converted to a sole application of Benjamin B. Bauer, describes and claims the arrangement of the pole pieces 36 and 36′ with the small end sections 41 and 41′ in overlapping relationship and the provision of a similarly oriented notch or groove in each pole piece for the travel of the wire. The wire travels in the base of the groove and approaches magnetically the condition of being surrounded by the material of the pole pieces. At the same time, the opening does not completely surround the wire so that the wire does not need to be threaded through the opening but needs only to be inserted laterally or laid into the groove. By having only the small end sections 41 and 41′ in overlapping relationship and the bases of the slots 44 and 44′ located a substantial distance inwardly from the edge portions of said sections, the flux is concentrated in the vicinity of the wire and the maximum proportion of the flux traverses the wire rather than the portion of the non-magnetic gap surrounding the wire. To accomplish the desired result, the notches in the pole pieces are of a depth greater than the diameter of the wire, which in conformity with common practice, is about .004 inch. In the construction which has been specifically described and illustrated, the top and end edges of each pole piece extend horizontally and vertically respectively and the outer edge of the slot extends in an inclined direction from the junction of the end and top edges of the pole piece to the base of the slot which is at a horizontal distance of about .012 inch from the end of the pole piece and vertical distances of about .020 inch from the top edge and about .033 inch from the bottom edge of the pole piece. In such construction, the area of each overlapping section is approximately .0015 square inch. The shape of the overlapping sections may be different from that described and illustrated and, in general, it is desired that the area of the overlapping section of each pole piece be not more than approximately .040 square inch and that the boundary of such section be spaced not more than approximately .10 inch in any direction from the base of the slot therein.

While but a single embodiment of the invention has been described and illustrated, this is by way of example and the invention is not limited thereto. Variations may be made within the spirit of the invention as the same is set forth in the appended claims.

This application is a continuation of our application S. N. 32,558 filed June 12, 1948.

What is claimed is:

1. In a magnetic transducer head construction, a pair of complementary non-magnetic body members having mating faces complementarily recessed to receive a magnet, a magnet in said recess, said magnet comprising a para-magnetic core element having a pair of pole pieces and a winding about said core element, said pole pieces being arranged with their end portions in overlapping relationship transversely of the head and spaced apart longitudinally of the head, non-magnetic spacing means between said overlapping portions to form a non-magnetic gap therebetween, said pole pieces, spacing means and body members being jointly adapted to have a continuous recording medium travel longitudinally thereover transversely of and in engagement with the overlapping portions of said pole pieces, and means for drawing said body members toward each other and clamping said pole pieces and spacing means together under pressure between said body members and thereby fixing the length of said non-magnetic gap.

2. A transducer head as claimed in claim 1, in which the body members are longitudinally grooved to guide the medium, said groove exposing the said pole pieces in said groove.

3. A magnetic transducer head construction as claimed in claim 1, in which the body members, pole pieces and spacing means have a continuous groove in the surfaces thereof adapted to have the recording medium travel therein, and, the surfaces of the pole pieces are depressed with respect to the corresponding surfaces of the body members in such manner that the portions of the groove formed by the pole pieces are shallower than the portions formed by the body members.

4. The transducer head as claimed in claim 1, in which at least one of the body members has one or more projections therein and the pole pieces and spacing means have openings therein cooperating with said projections to fix said parts in their relative postions.

References Cited in the file of this patent

UNITED STATES PATENTS

| | | |
|---|---|---|
| 1,970,424 | Frink | Aug. 14, 1934 |
| 2,020,211 | Quam | Nov. 5, 1935 |
| 2,020,212 | Quam | Nov. 5, 1935 |
| 2,233,621 | Lovell | Mar. 4, 1941 |
| 2,281,793 | Patrick | May 5, 1942 |
| 2,413,108 | Latchford | Dec. 24, 1946 |
| 2,418,542 | Camras | Apr. 8, 1947 |
| 2,469,444 | Roys | May 10, 1949 |
| 2,513,617 | Begun | July 4, 1950 |
| 2,555,110 | Bobb | May 29, 1951 |
| 2,561,365 | Hare | July 24, 1951 |
| 2,587,097 | Berlant | Feb. 26, 1952 |

FOREIGN PATENTS

| | | |
|---|---|---|
| 230,970 | Switzerland | May 1, 1944 |
| 239,566 | Switzerland | June 1, 1946 |
| 423,504 | Italy | July 17, 1947 |
| 937,535 | France | Mar. 8, 1948 |